Patented Aug. 18, 1925.

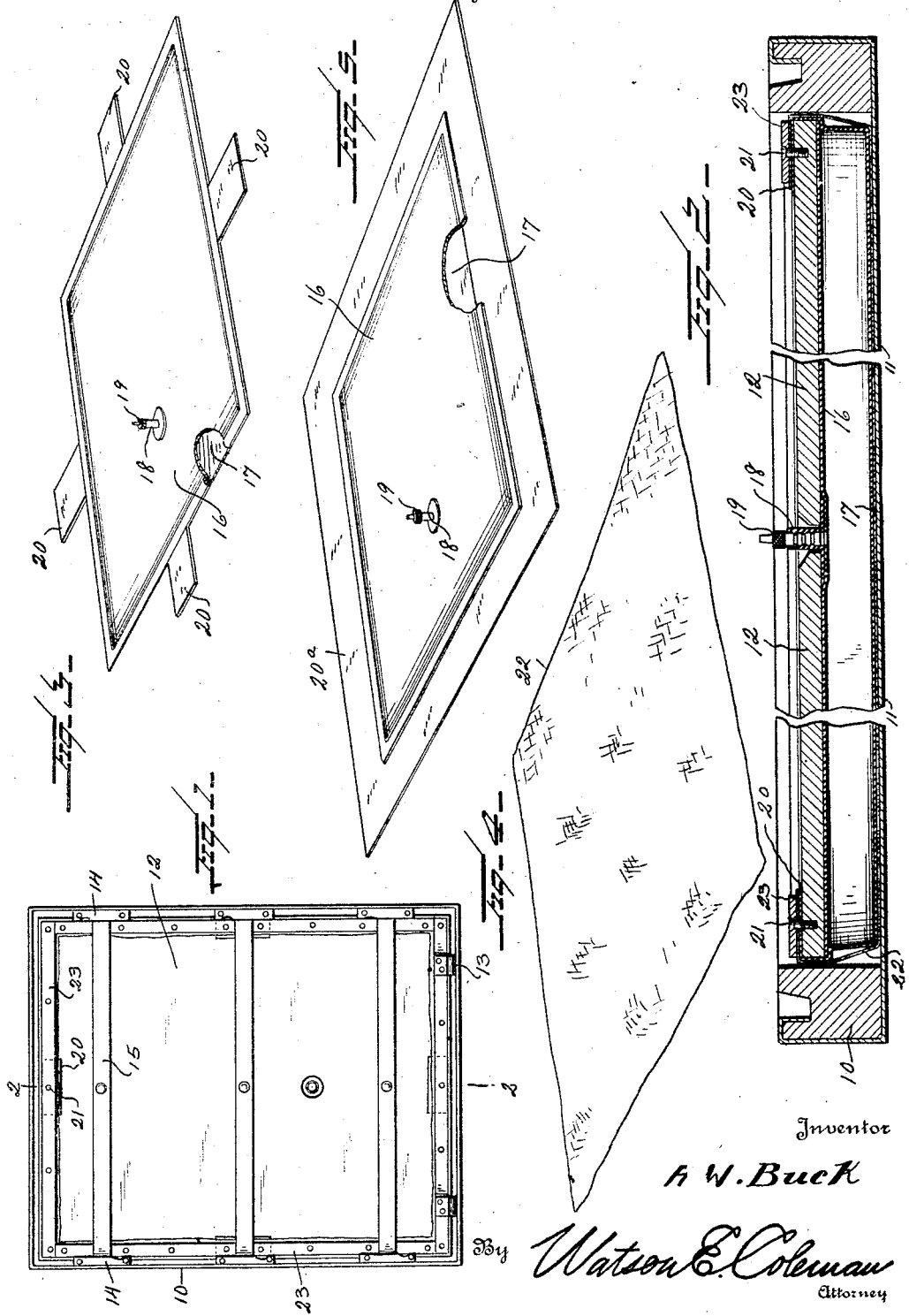

1,550,499

UNITED STATES PATENT OFFICE.

ARTHUR W. BUCK, OF ST. LOUIS, MISSOURI.

PNEUMATIC PAD FOR CASSETTES.

Application filed July 22, 1924. Serial No. 727,532.

*To all whom it may concern:*

Be it known that I, ARTHUR W. BUCK, a citizen of the United States, residing at St. Louis, in the county of St. Louis and State of Missouri, have invented certain new and useful Improvements in Pneumatic Pads for Cassettes, of which the following is a specification, reference being had to the accompanying drawings.

This invention relates to cassettes such as are used in taking X-ray pictures, and particularly to a pad for use in connection with such a cassette as that illustrated in my pending application Serial #564,728, filed on the 31st day of May, 1922.

The ordinary cassette is formed of a more or less rectangular frame having sheet aluminum or material of an equivalent character stretched tightly across the frame forming the front of the cassette. The back of the cassette is hinged to the front and consists of a relatively stiff plate of aluminum or other suitable material which sets into the rectangular frame. The back is ordinarily lined with felt so as to secure a close contact of the film against the front of the cassette.

In the taking of X-ray pictures by means of these cassettes, intensifying screens are often used and it becomes particularly necessary, where these intensifying screens are used and where Potter-Bucky diaphragms are used, that special means be provided for holding the screens in close contact over their entire surface with the X-ray film. It was impossible to secure this close contact with the use of felt and, therefore, pneumatic pads were designed for this purpose. These pneumatic pads, however, were simply inserted between the back of the cassette and the film or intensifying screen and it was difficult to properly inflate these pads so as to secure close contact or to so dispose the pad that it would secure proper contact over the entire surface of the fluorescent screen and film.

In order to avoid these difficulties, it was necessary to provide means whereby the pad could be permanently attached to the inside of the back, and to this end I tried gluing the rubber pad to the inside of the cassette cover, but I found that this was not at all practical. This is a difficult thing to do, and furthermore as the cassette is opened and closed the air travels from one end of the pad to the other and produces a "crawling" movement which will sooner or later cause the pad to become detached from the cassette cover.

In order to avoid this, I provide a pad having non-inflatable extensions which are permanently attached to the back so that the pad is always attached to the back of the cassette frame. Such an extension greatly assists in holding the pad in position, but preferably I provide a plurality of extensions from the margin of the pneumatic pad which will engage with the back of the cassette, and provide means whereby the pneumatic pad may be inflated through an opening in the back of the cassette.

My invention is illustrated in the accompanying drawing, wherein:—

Figure 1 is a rear elevation of a cassette constructed in accordance with my invention;

Figure 2 is an enlarged section on the line 2—2 of Figure 1;

Figure 3 is a perspective view of the rubber pad and extensions;

Figure 4 is a perspective view of the felt sheet or covering;

Figure 5 is a perspective view of a slightly modified form of pad;

Referring to these drawings, it will be seen that the cassette is of the usual form and comprises the rectangular frame 10, the front sheet 11, and the back 12. As far as the present invention goes, I do not wish to be limited to any particular form or construction for the back and front of the cassette. The back is illustrated as hinged at 13 to the front. This frame and the back and front are preferably constructed of sheet aluminum. The frame 10 is provided at intervals with keepers 14 and the back 12 is provided with spring latches 15 engageable with said keepers. Preferably a pneumatic pad is used. There are three sets of these keepers and three springs 15.

The pneumatic pad consists of two sheets of rubber 16 and 17 which are attached at their margins in any suitable manner and, of course, vulcanized so as to be air-tight, and the middle of one of these sheets is provided with the outwardly projecting nipple 18 which extends through the back and is provided with an air valve 19 such as is used on a pneumatic tire. Projecting from the margins of the pneumatic pad are a plurality of tabs or extensions 20. Preferably there are four of these extensions, one extending from each side edge of the pad, and preferably, though not necessarily, these extensions are brought around to the outside of the back, as shown in Figure 2, and are fastened by means of screws, rivets or any other suitable means, designated generally 21. This means may be such as will permit the detachment of the pad in case it becomes worn and permit the replacement of the worn pad by a new pad, or the means may be permanent. These extensions or tabs are of relatively thin material so that they form no practical impediment to the insertion of the back within the frame 10. Preferably a felt or cloth covering, which is designated 22, extends over the inner face of the pad and preferably the margins of this covering are brought around the edges of the back and over upon the outside thereof and are held in pace by metallic strips 23. These metallic strips 23 are riveted, screwed or otherwise attached to the frame by the screws 21 and extend over the margins of the felt and over the projecting tabs.

As before remarked, I do not wish to be limited to the particular number of tabs or extensions, nor to these extensions having the particular form shown in Figure 3, as it is obvious that the extension might be in the form of a thin strip extending around the entire margin of the back, as illustrated in Figure 5 and designated 20ª. In any case, the pneumatic pad is held from any movement.

A pneumatic pad constructed in accordance with my invention requires but very little inflation, the pressure on the screen being obtained when the cover is closed, thereby pressing the pad against the screen. On account of the small amount of inflation necessary, the pad is always limber, having no particular shape, and this is the reason why it must be held to the cover of the cassette in some manner which will prevent its wadding or curling up. This prevention of wadding or curling up is secured by attaching the pneumatic pad to the cover or back by means of the tabs described.

While I have illustrated a construction which has been found to be thoroughly practical and effective, I do not wish to be limited to this as it is obvious that slight changes might be made within the scope of the claims without departing from the spirit of the invention.

I claim:

1. The combination with a cassette having a back and front, of a hollow pneumatic pad disposed on the inside face of the back and having non-inflated portions extending outward beyond the hollow portion of the pad and secured to the back.

2. The combination with a cassette having a back and front, of a hollow pneumatic pad disposed on the inside face of the back and having relatively thin, non-inflated portions extending over onto the back and secured thereto.

3. The combination with a cassette having a back and front, of a hollow pneumatic pad disposed on the inside face of the back and having relatively thin tabs extending out over the margins of the pad and extending over onto the outer face of the back and secured thereto.

4. The combination with a cassette having a back and front, of a hollow pneumatic pad disposed on the inside face of the back and having an area approximately the same as that of the back, said pneumatic pad having non-inflated tabs extending outward therefrom and extending over onto the outer face of the back, a layer of woven fabric extending over the inside face of the pad and having its margins extending over said tabs and over upon the outside face of the back, and means engaged with the outer face of the back and engaging over the felt and the tabs of the pneumatic pad.

5. A cassette having a back and front, and a hollow pneumatic pad disposed on the inside face of the back and attached at its margins to the back, the remainder of the pad being free from attachment to the back, there being an inflating valve carried by the back and communicating with the cassette.

6. A cassette having a back and front, and a hollow pneumatic pad disposed on the inside face of the back and attached at its margins to the back, the remainder of the pad being free from attachment to the back, the cassette having a nipple, the back of the cassette having an opening through which the nipple extends and there being an inflating valve connected to said nipple.

7. As an article of manufacture, a pneumatic pad for cassettes comprising a hollow pad proper, the margin of the pad having a plurality of relatively thin, flexible, non-inflated tabs extending from its sides and adapted to be folded over onto the outer face of the back and engaged therewith, the central portion of one face of the pad being formed with a nipple whereby it may be inflated.

In testimony whereof I hereunto affix my signature.

ARTHUR W. BUCK.